US010810068B2

(12) United States Patent
Cader et al.

(10) Patent No.: US 10,810,068 B2
(45) Date of Patent: Oct. 20, 2020

(54) VALVE FAILURE PREDICTIONS

(71) Applicant: Hewlett Packard Enterprise Development LP, Houston, TX (US)

(72) Inventors: Tahir Cader, Liberty Lake, WA (US); John Franz, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 220 days.

(21) Appl. No.: 15/757,032

(22) PCT Filed: Sep. 4, 2015

(86) PCT No.: PCT/US2015/048495
§ 371 (c)(1),
(2) Date: Mar. 2, 2018

(87) PCT Pub. No.: WO2017/039683
PCT Pub. Date: Mar. 9, 2017

(65) Prior Publication Data
US 2019/0079815 A1 Mar. 14, 2019

(51) Int. Cl.
*G06F 11/00* (2006.01)
*G06F 1/20* (2006.01)
(Continued)

(52) U.S. Cl.
CPC ............... *G06F 11/00* (2013.01); *F01P 7/14* (2013.01); *F01P 11/14* (2013.01);
(Continued)

(58) Field of Classification Search
None
See application file for complete search history.

(56) References Cited

U.S. PATENT DOCUMENTS 5,117,677 A 6/1992 Hendershot et al.
6,679,202 B2 1/2004 Nakano
(Continued)

FOREIGN PATENT DOCUMENTS

CA 2527563 A1 3/2006
CN 101874161 A 10/2010
(Continued)

OTHER PUBLICATIONS

International Search Report and Written Opinion received for PCT Patent Application No. PCT/US2015/048495, dated Jun. 3, 2016, 10 pages.
(Continued)

*Primary Examiner* — Gregory J Toatley, Jr.
*Assistant Examiner* — Brandon J Becker
(74) *Attorney, Agent, or Firm* — Brooks, Cameron & Huebsch, PLLC

(57) ABSTRACT

In one implementation, a system for valve failure prediction includes a temperature engine to determine a temperature of a liquid exiting a cooling device, a flowrate engine to compare an actual flow rate of the liquid exiting the cooling device to a flow rate threshold, a prediction engine to determine when a valve of the cooling device is malfunctioning based on the comparison of the actual flow rate and the flow rate threshold, and a notification engine to notify a user when the valve of the cooling device is malfunctioning.

20 Claims, 3 Drawing Sheets

(51) Int. Cl.
  *F01P 7/14*   (2006.01)
  *F01P 11/14*  (2006.01)
  *G05B 23/02*  (2006.01)

(52) U.S. Cl.
  CPC ......... *G05B 23/0283* (2013.01); *G06F 1/206* (2013.01); *F01P 2007/146* (2013.01); *F01P 2031/00* (2013.01); *G06F 2200/201* (2013.01)

(56) References Cited

U.S. PATENT DOCUMENTS

| | | | |
|---|---|---|---|
| 6,937,963 | B2 | 8/2005 | Ishii |
| 7,195,036 | B2 | 3/2007 | Burns |
| 7,436,666 | B1 | 10/2008 | Konshak |
| 7,969,736 | B1 | 6/2011 | Iyengar et al. |
| 8,493,735 | B2 * | 7/2013 | Iijima ................ G06F 1/20 361/679.53 |
| 8,739,605 | B2 | 6/2014 | McLain |
| 2003/0172882 | A1 | 9/2003 | Nakano |
| 2008/0294382 | A1 | 11/2008 | Lim |
| 2009/0216910 | A1 * | 8/2009 | Duchesneau ......... G06F 9/5072 709/250 |
| 2010/0246117 | A1 | 9/2010 | Brunschwiler et al. |
| 2011/0110043 | A1 | 5/2011 | Iijima |
| 2012/0180979 | A1 | 7/2012 | Harrington |
| 2012/0209569 | A1 | 8/2012 | Becourt |
| 2012/0324985 | A1 | 12/2012 | Gu et al. |
| 2013/0030641 | A1 * | 1/2013 | Olsen, III ............. G07C 5/085 701/31.6 |
| 2014/0095049 | A1 | 4/2014 | Jentz et al. |
| 2014/0124188 | A1 | 5/2014 | Xu |
| 2014/0138399 | A1 | 5/2014 | Estelle |
| 2014/0251583 | A1 | 9/2014 | Eriksen |
| 2016/0161952 | A1 | 6/2016 | Buvid et al. |
| 2018/0112656 | A1 | 4/2018 | Cader et al. |

FOREIGN PATENT DOCUMENTS

| | | |
|---|---|---|
| CN | 103718218 A | 4/2014 |
| CN | 103813688 A | 5/2014 |
| CN | 103835931 A | 6/2014 |
| CN | 104037103 A | 9/2014 |
| CN | 104477158 A | 4/2015 |
| EP | 0440320 A1 | 8/1991 |
| EP | 1297730 B1 | 9/2005 |
| EP | 3271798 A1 | 1/2018 |
| JP | 2013224752 A | 10/2013 |
| KR | 20070087139 | 8/2007 |
| WO | WO-2012170802 | 12/2012 |
| WO | 2017/039682 A1 | 3/2017 |

OTHER PUBLICATIONS

International Search Report and Written Opinion received for PCT Patent Application No. PCT/US2015/048492, dated Jun. 3, 2016, 10 pages.
International Preliminary Report on Patentability received for PCT Patent Application No. PCT/US2015/048495, dated Mar. 15, 2018, 9 pages.
International Preliminary Report on Patentability received for PCT Patent Application No. PCT/US2015/048492, dated Mar. 15, 2018, 9 pages.
European Search Report and Search Opinion Received for EP Application No. 15903252.3, dated Mar. 12, 2018, 6 pages.
European Search Report and Search Opinion Received for EP Application No. 15903251.5, dated Oct. 11, 2018, 8 pages.
Schwerdt, H.; Application of Ferrofluid as a Valve/pump for Polycarbonate Microfluidic Devices:, Aug. 15, 2006, <http://www.seas.upenn.edu/sunfest/docs/papers/Schwerdt.pdf>.

* cited by examiner

VALVE FAILURE PREDICTIONS

BACKGROUND

Computing systems can include cooling systems that can include cooling devices such as a thermal busbar (TBB). The thermal busbar can include a number of cooling elements to maintain computing components at an operating temperature. It can be important to maintain functionality of the thermal busbar through long periods of usage since thermal busbar failures can result in damaged computing components due to overheating.

DETAILED DESCRIPTION

Figure 1:
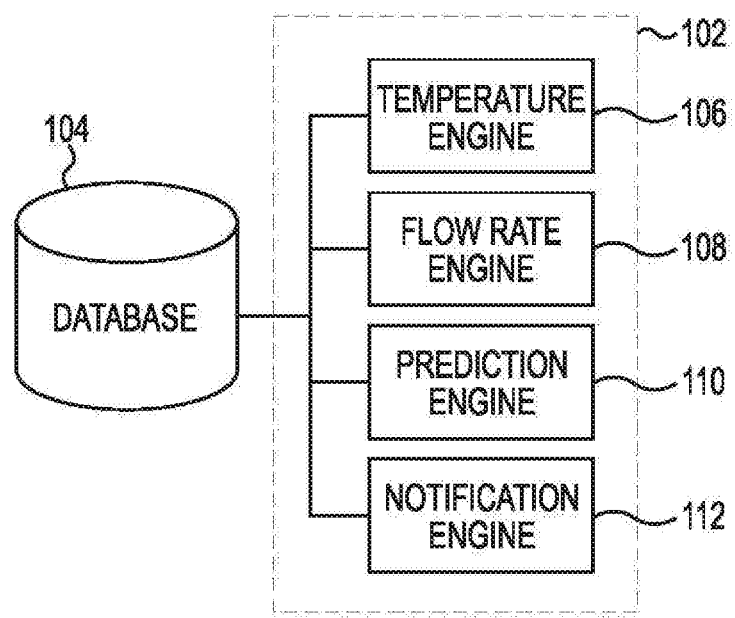
FIG. 1 illustrates a diagram of an example of a system for valve failure prediction consistent with the present disclosure.

A number of methods, systems, and computer readable medium for valve failure prediction are described herein. Computing systems can utilize a thermal busbar as part of a cooling system for cooling computing components. The cooling system can utilize a thermal busbar that includes a number of valves and/or a number of pumps to control liquid flow between components of the computing system. The number of valves can include a number of wax valves that can open when a temperature of the liquid (e.g., water, coolant liquid, etc.) used to cool the devices is above a temperature threshold (e.g., relatively hot). In addition, the number of valves can include a number of wax valves that can close when a temperature of the liquid used to cool the devices is below (e.g., less than) a temperature threshold (e.g., relatively cool).

In some examples, the number of wax valves can provide passive liquid flow control for the devices of the computing system. For example, when a particular computing device (e.g., processor, computing component, etc.) is being utilized, the computing device will heat up (e.g., produce heat) the liquid and cause a number of the wax valves to open and circulate liquid to a number of cooling devices. In another example, when a particular device is not being utilized or being utilized to a lesser extent, the temperature of the liquid can cool down and cause a number of the wax valves to close and not circulate liquid. The passive liquid flow control can provide cooling capacity to the computing devices when needed and also provide for adequate cooling efficiency.

The number of valves can be subject to failures, which can result in inadequate cooling or inadequate cooling efficiency of the thermal busbar and/or overall cooling system. For example, the number valves can fail in an open position, a closed position, and/or a partially open position. Each of the valve failures can result in either inadequate cooling capacity for the number of devices of the computing system or inadequate cooling efficiency for the number of devices of the computing system. For example, when a number of valves fail in a closed position, circulation to a number of devices can be limited and a cooling capacity for the number of devices can be inadequate. In another example, when a number of valves fail in an open position, circulation to a number of devices can continue even when the number of devices are not being utilized and thus providing inadequate cooling efficiency for the number of devices in the computing system.

Determining a valve failure can be difficult in some examples. Previous systems and methods can utilize device temperatures to determine when there is a likely failure of components of the cooling system. However, it can be difficult to determine which components of the cooling system are malfunctioning. The valve failure prediction methods and systems described herein can indicate a predicted failure of a number of valves based on a monitored temperature of the liquid exiting the thermal busbar and/or a flow rate of the liquid exiting the thermal busbar. Predicting failure of the number of valves can eliminate the inadequate cooling capacity and/or inadequate cooling efficiency due to valve failures. Examples of a thermal busbar are used herein as an example of utilizing the methods and systems, however, the systems and methods described herein can be utilized to predict valve failures for other cooling systems that utilize passive flow control systems.

Figure 2:
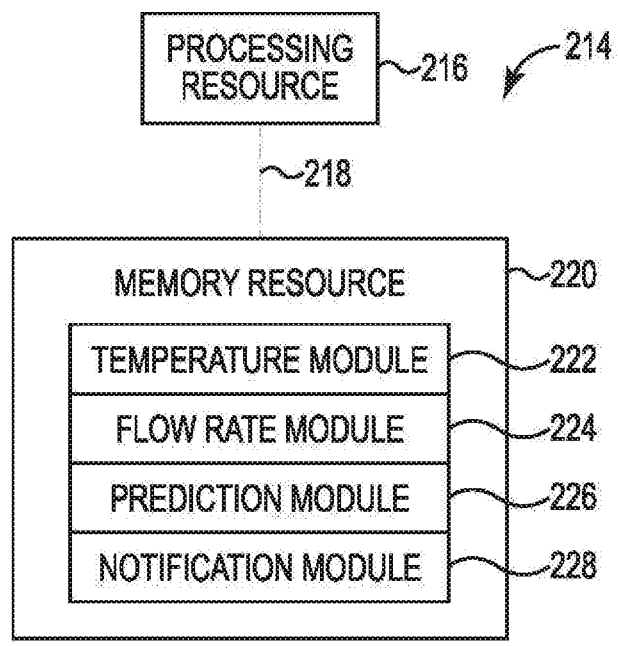
FIG. 2 illustrates a diagram of an example computing device for valve failure prediction consistent with the present disclosure.

FIGS. 1 and 2 illustrate examples of system and computing device 214 consistent with the present disclosure. FIG. 1 illustrates a diagram of an example of a system for valve failure prediction consistent with the present disclosure. The system can include a database 104, a valve failure prediction system 102, and/or a number of engines (e.g., temperature engine 106, flow rate engine 108, prediction engine 110, notification engine 112). The valve failure prediction system 102 can be in communication with the database 104 via a communication link, and can include the number of engines (e.g., temperature engine 106, flow rate engine 108, prediction engine 110, notification engine 112). The valve failure prediction system 102 can include additional or fewer engines than are illustrated to perform the various functions as will be described in further detail in connection with FIGS. 3-4.

The number of engines (e.g., temperature engine 106, flow rate engine 108, prediction engine 110, notification engine 112) can include a combination of hardware and programming, but at least hardware, that is configured to perform functions described herein (e.g., determine a temperature of a liquid exiting a cooling device, compare an actual flow rate of the liquid exiting the cooling device to a flow rate threshold, determine when a valve of the cooling device is malfunctioning based on the comparison of the actual flow rate and the flow rate threshold, notify a user when the valve of the cooling device is malfunctioning, etc.) stored in a memory resource (e.g., computer readable medium, machine readable medium, etc.) as well as hard-wired program (e.g., logic).

The temperature engine 106 can include hardware and/or a combination of hardware and programming, but at least hardware, to determine a temperature of a liquid exiting a cooling device. The temperature of the liquid exiting the cooling device can be monitored by a number of temperature sensors. In some examples, the cooling device can be a thermal busbar that utilizes a number of wax valves to control liquid circulation and cooling of a number of devices (e.g., computing components, etc.) within a computing system (e.g., computer, server, rack server, etc.). The number of wax valves can provide passive flow control of the liquid circulation for a liquid cooling system utilized to cool a computing system. As used herein, passive flow control can include utilizing a number of wax valves that can respond (e.g., open, close, etc.) to liquid temperatures.

The flow rate engine 108 can include hardware and/or a combination of hardware and programming, but at least hardware, to compare an actual flow rate of the liquid exiting the cooling device to a flow rate threshold. The flow rate engine 108 can receive and/or determine a current flow rate of liquid exiting a thermal busbar via the number of wax valves. The flow rate of the liquid can be determined by a number of flow rate sensors coupled to liquid lines exiting the thermal busbar. The flow rate threshold can be a value that corresponds to a flow rate that can indicate a current wax valve failure and/or a future wax valve failure.

In some examples, the flow rate threshold can correspond to a particular temperature of the liquid. For example, a first flow rate threshold can correspond to a first temperature and a second flow rate threshold can correspond to a second temperature that is different than the first temperature. Thus, the flow rate threshold can be a value that corresponds to a flow rate that can indicate a wax valve failure for each corresponding temperature.

The prediction engine 110 can include hardware and/or a combination of hardware and programming, but at least hardware, to determine when a valve of the cooling device is malfunctioning based on the comparison of the actual flow rate and the flow rate threshold. As described herein, the prediction engine 110 can determine when a valve and/or wax valve is malfunctioning based on a comparison of the actual flow rate and the flow rate threshold. In some examples, the prediction engine 110 can determine what flow rate threshold to utilize for the comparison based on the determined liquid temperature.

The notification engine 112 can include hardware and/or a combination of hardware and programming, but at least hardware, to notify a user when the valve of the cooling device is malfunctioning. The notification engine 112 can send a notification to a number of users based on a type of valve malfunctions determined. For example, the notification engine 112 can send an alert to a user that can repair the malfunctioning valve as well as an alert to a user and/or device controlling device utilization of the computing system. In some examples, it can be advantageous to stop particular devices from being utilized when there are a number of valves malfunctioning to prevent overheating and/or damage to the particular devices. Thus, it can be advantageous to notify a user and/or device controlling device utilization that a number of valves are malfunctioning or may malfunction.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., compare an actual temperature of a liquid exiting a thermal bulbar to a temperature threshold, compare an actual flow rate exiting the thermal busbar to an overall flow rate threshold when the actual temperature of the liquid is greater than the temperature threshold, compare the actual flow rate exiting the thermal busbar to a first flow rate threshold and a second flow rate threshold when the actual flow rate is less than the overall flow rate threshold, send a first alert to a user when the actual flow rate is below the first flow rate threshold and send a second alert to the user when the actual flow rate is between the first flow rate threshold and the second flow rate threshold, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., temperature module 222, flow rate module 224, prediction module 226, notification module 228) can include CRI that when executed by the processing resource 216 can perform functions. The number of modules (e.g., temperature module 222, flow rate module 224, prediction module 226, notification module 228) can be sub-modules of other modules. For example, the temperature module 222 and the flow rate module 224 can be sub-modules and/or contained within the same computing device. In another example, the number of modules (e.g., temperature module 222, flow rate module 224, prediction module 226, notification module 228) can comprise individual modules at separate and distinct locations (e.g., CRM, etc.).

Each of the number of modules (e.g., temperature module 222, flow rate module 224, prediction module 226, notification module 228) can include instructions that when executed by the processing resource 216 can function as a corresponding engine as described herein. For example, the temperature module 222 can include instructions that when executed by the processing resource 216 can function as the temperature engine 106.

Figure 3:
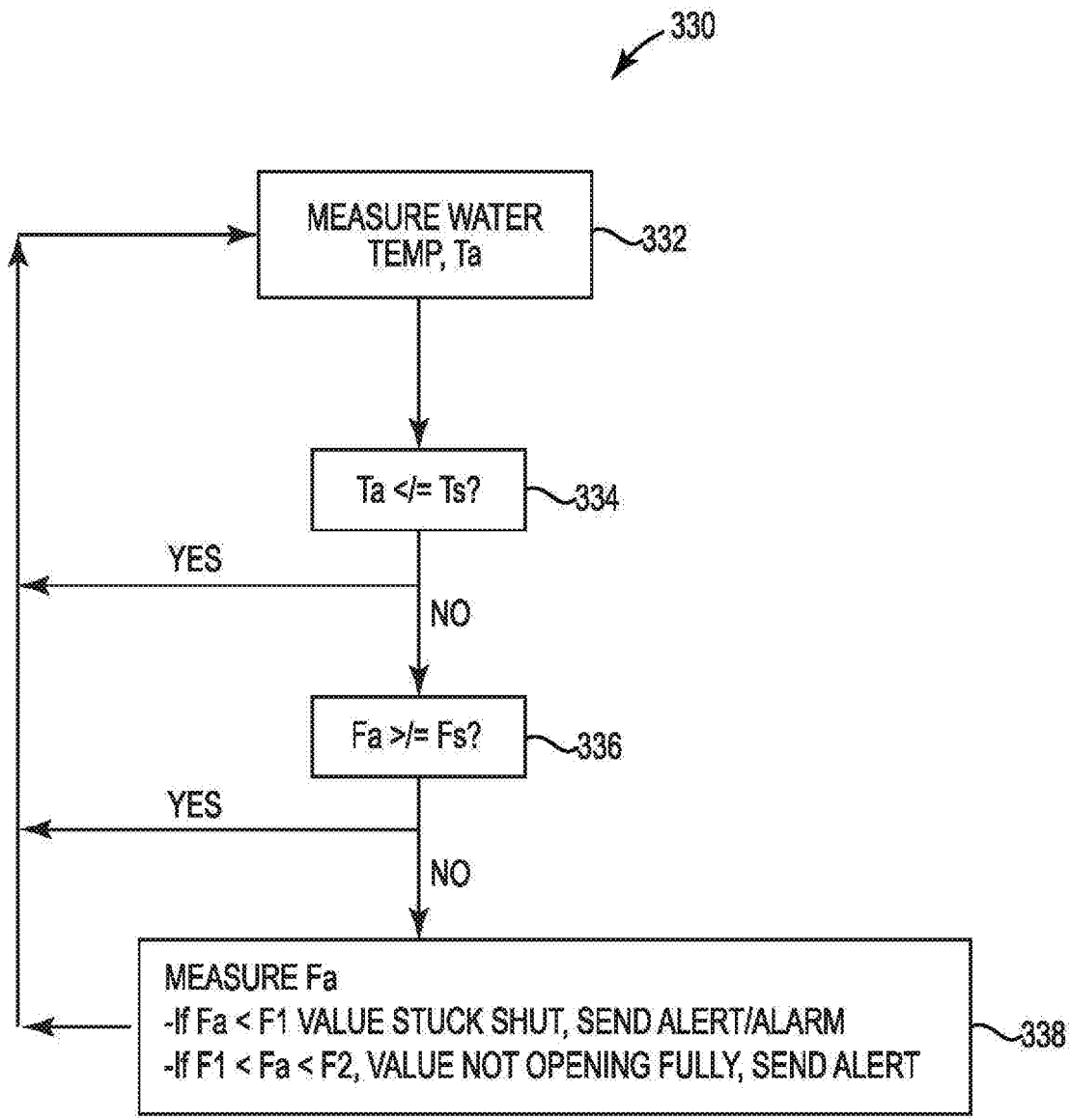
FIG. 3 illustrates a flow chart of an example of a method for valve failure prediction consistent with the present disclosure.

FIG. 3 illustrates a flow chart of an example of a method 330 for valve failure prediction consistent with the present disclosure. The method 330 can be executed by a computing system such as system 102 as referenced in FIG. 1 and/or a computing device such as computing device 214 as referenced in FIG. 2. The method 330 can provide accurate valve failure prediction compared to previous systems and methods. Thus, the method 330 can be utilized to better maintain a cooling device with a passive flow control that utilizes a number of wax valves for controlling liquid circulation to a number of devices.

In some examples, the method 330 can be utilized for a thermal busbar cooling system that utilizes a number of wax valves that provide passive flow control for computing devices associated with the thermal busbar. The number of wax valves can open when a temperature of liquid used to cool the computing devices associated with the thermal busbar is relatively high (e.g., relatively hot, relatively warm, etc.) or greater than a threshold temperature. In addition, the number of wax valves can close when a temperature of the liquid used to cool the computing devices associated with the thermal busbar is relatively low (e.g., relatively cold, relatively cool, etc.) or less than a threshold temperature.

The method 330 can include measuring the water temperature at 332. Measuring the water temperature can include measuring the actual temperature (Ta) of liquid exiting a cooling device. For example, the method 330 can include measuring the actual temperature of water exiting a thermal busbar of the cooling system. The temperature of the liquid can be measured by a number of sensors coupled to the thermal busbar and/or liquid lines coupled to the thermal busbar.

At 334, the method 330 can include comparing the actual temperature (Ta) with a temperature threshold (Ts). The temperature threshold can correspond to a temperature or value that represents a temperature at which a particular liquid flow rate would correspond. In some examples, the temperature threshold can correspond to a predicted temperature for device utilization at a particular time. When the actual temperature is less than or equal to the temperature threshold, the method 330 can return to measuring the actual temperature at 332. However, when the actual temperature is greater than the temperature threshold, the method 330 can proceed to 336.

At 336, the method 330 can include comparing an actual flow rate (Fa) with a flow rate threshold (Fs). The actual flow rate can be a value representing rate of liquid exiting a thermal busbar. The actual flow rate can be monitored by a number of sensors that are coupled to the thermal busbar and/or liquid line of the cooling system. The flow rate threshold can be a value for a flow rate that can represent a lower threshold value for flow rates at particular temperatures. Comparing the actual flow rate to the flow rate threshold can indicate a possible malfunction of one or more of the wax valves associated with the thermal busbar. In some examples, when the actual flow rate is greater than or equal to the flow rate threshold the method 330 can return to measuring the actual temperature at 332. In some examples, when the actual flow rate is less than the flow rate threshold the method 330 can move to 338.

At 338, the method 330 can include comparing the actual flow rate (Fa) to a valve closed position set-point (F1) and/or a valve partially open position set-point (F2). When the actual flow rate is less than the closed position set-point it can be determined that a particular wax valve and/or a plurality of wax vales are likely in a stuck closed position (e.g., unable to change to an open position to allow liquid to flow through the wax valve, etc.). When the actual flow rate is less than the closed position set-point an alert or alarm can be sent to a device or user to indicate that a wax valve is in a stuck closed position. In some examples, the alert can include an indication that a particular wax valve that is malfunctioning and/or stuck in the closed position. Since a thermal busbar can include a plurality of wax valves, it can be advantageous to identify a particular wax valve that is currently malfunctioning or likely to malfunction.

When the actual flow rate is greater than the closed position set-point and less than the open positioned set-point it can be determined that a particular wax valve is likely not opening fully or stuck in a partially open position. When the actual flow rate is greater than the closed position set-point and less than the open positioned set-point an alert or alarm can be sent to a device or user. In some examples, the alert or alarm can indicate a particular wax valve that is malfunctioning and/or not opening fully.

The method 330 can be utilized to identify particular wax valves that are malfunctioning within a passive flow control cooling system that includes a plurality of wax valves. A number of other variables can be utilized with the method 330 to more accurately identify particular wax valves that are malfunctioning. For example, the method 330 can utilize variables such as: device temperature, device power consumption, water temperature, flow rate, pressure drop, among other variables associated with the cooling system. In one example, the device power consumption can draw relatively more power for a given workload when a number of wax valves are malfunctioning, Even though the method 330 is described in relation to a thermal busbar, it can also be utilized in relation to other cooling components of a cooling system. For example, the method 330 can be utilized in relation to a server tray, a rack quadrant, a half rack, and/or a full rack level of a computing system.

The method 330 can provide alerts to users or devices to detect issues early enough to allow for pre-emptive maintenance to be scheduled on the cooling system. The method 330 can allow for maintenance to be completed before damage to computing components occurs from a malfunctioning cooling system.

Figure 4:
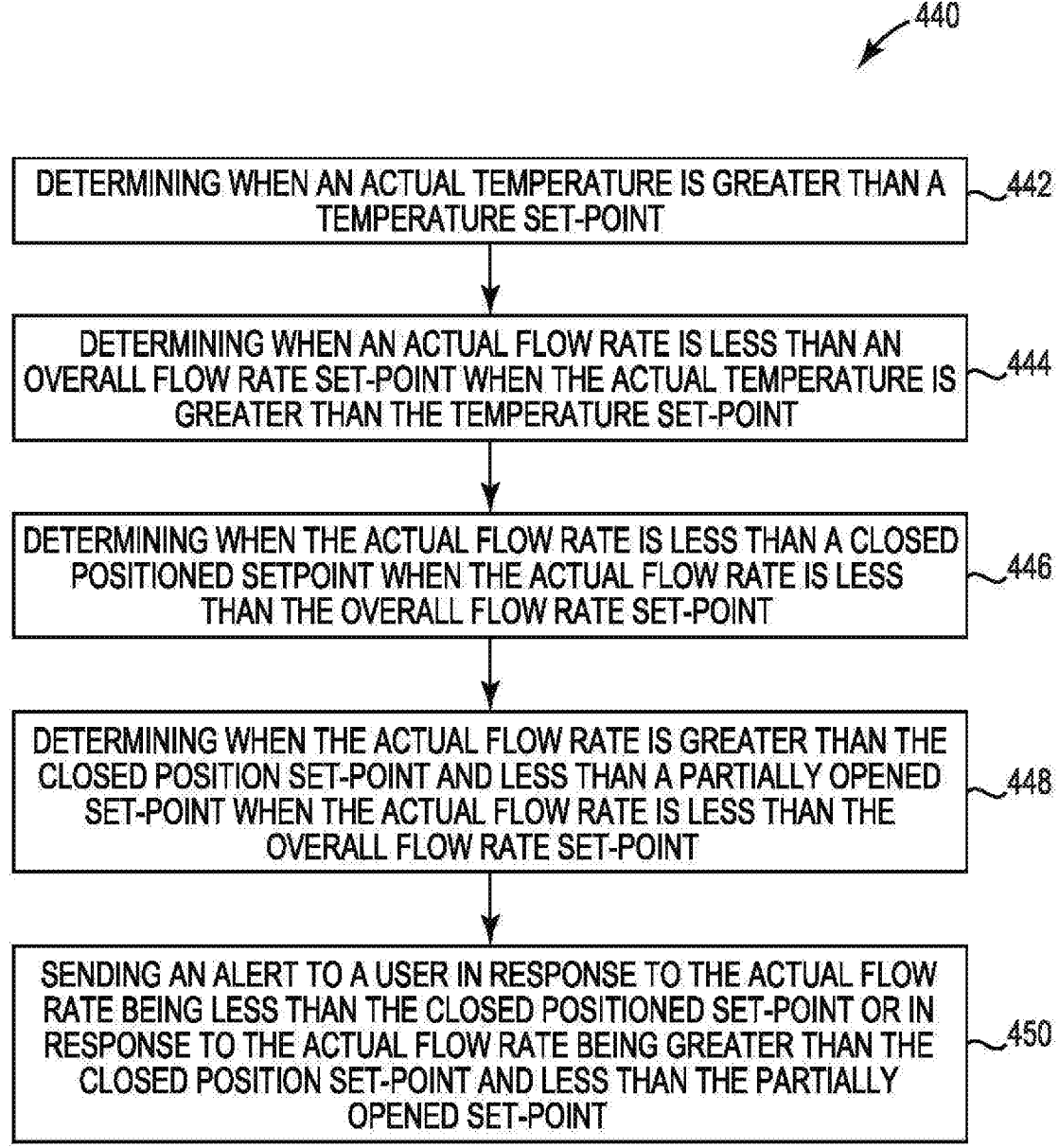
FIG. 4 illustrates a flow chart of an example of a method for valve failure prediction consistent with the present disclosure.

FIG. 4 illustrates a flow chart of an example of a method 440 for valve failure prediction consistent with the present disclosure. The method 440 can be implemented by a system or computing device as described herein. The method 440 can be utilized to identify potential component valve malfunctions for a cooling system that utilizes a passive flow control by utilizing a plurality of wax valves to control liquid circulation.

At 442, the method 440 can include determining when an actual temperature is greater than a temperature threshold. Determining when the actual temperature (Ta) is greater than a temperature threshold (Ts) can include comparing a current temperature reading to the temperature threshold. In some examples the current temperature reading can be a value that represents a current temperature of liquid exiting a cooling device such as a thermal busbar. In some examples, the temperature threshold can be defined based on normal temperature operating conditions of the liquid that is exiting the thermal busbar.

At 444, the method 440 can include determining when an actual flow rate is less than an overall flow rate threshold when the actual temperature is greater than the temperature threshold. The actual flow rate (Fa) can be a speed of liquid exiting a cooling device such as a thermal busbar. The actual flow rate can be based on a number of sensor readings at a location at or near the exit of the thermal busbar.

The actual flow rate can be compared to the overall flow rate threshold (Fs) to determine if the actual flow rate is less than the overall flow rate threshold. In some examples, the overall flow rate threshold (Fs) can represent a speed of liquid flow exiting a cooling device during normal operating conditions associated with a particular temperature of the liquid. That is, an overall flow rate threshold (Fs) can be assigned to each of a number of different temperatures to determine if a valve associated with a thermal busbar is opened to a particular position (e.g., completely open, completely closed, partially opened, etc.) to allow liquid to flow at a particular rate.

At 446, the method 440 can include determining when the actual flow rate is less than a closed positioned set-point when the actual flow rate is less than the overall flow rate threshold. When the actual flow rate is less than the overall flow rate threshold, the actual flow rate can be compared to a closed positioned set-point (F1) to determine when the actual flow rate is less than the closed positioned set-point. In some examples, when the actual flow rate is less than the closed positioned set-point, an alert or alarm can be sent to a user or device to indicate that a particular valve is stuck in a closed positioned (e.g., stuck shut, stuck closed, malfunctioning in a closed position, etc.). As described herein, the valve can be a passive flow control valve such as a wax valve.

At 448, the method 440 can include determining when the actual flow rate is greater than the closed position set-point and less than a partially opened set-point when the actual flow rate is less than the overall flow rate threshold. When the actual flow rate is less than the overall flow rate threshold, the actual flow rate can be compared to a closed positioned set-point to determine when the actual flow rate is greater than the closed position set-point. When the actual flow rate is less than the closed positioned set point-point the method 440 can return to 442 to determine an actual temperature compared to the temperature threshold.

At 450, the method 440 can include sending an alert to a user in response to the actual flow rate being less than the closed positioned set-point or in response to the actual flow rate being greater than the closed position set-point and less than the partially opened set-point. In some examples, the alert that is sent can include an indication of a particular type of wax valve malfunction for a thermal busbar. For example, the type of wax valve malfunction can include: stuck in an open position, stuck in a closed position, and/or stuck in a partially open position. In some examples, the type of wax valve malfunction can be utilized to determine whether to send the alert to a particular user and/or a particular device. For example, when the wax valve malfunction type is that the valve is stuck in an open position, an alert can be sent to a maintenance user so that the maintenance user can be notified to fix the malfunction. In another example, when the wax valve malfunction type is that the valve is stuck in a closed position, an alert can be sent to the maintenance user and a device so that utilization of computing components associated with the malfunctioning wax valve can be lowered so that the computing components do not overheat while the wax valve is stuck in a closed position.

As described herein, the alert can be sent to a user or device to notify the user or device that there is a likely malfunction of a wax valve associated with a cooling device such as thermal busbar that is utilizing the wax valve for passive flow control.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
    a temperature engine to determine an actual temperature of a liquid exiting a cooling device comprising a valve;
    a flow rate engine to:
        determine when an actual flow rate of the liquid exiting the cooling device is less than an overall flow rate threshold when the actual temperature is greater than a temperature threshold;
        determine when the actual flow rate is less than a closed position set-point when the actual flow rate is less than the overall flow rate threshold; and
        determine when the actual flow rate is greater than the closed position set-point and less than a partially opened set-point when the actual flow rate is less than the overall flow rate threshold; and
    a notification engine to send a first alert to a user when the actual flow rate is less than the closed position set-point and send a second alert to the user when the actual flow rate is between the closed position set-point and the partially opened set-point.

2. The system of claim 1, further comprising a prediction engine, wherein the prediction engine is to determine that the valve is malfunctioning if the actual flow rate of the liquid exiting the cooling device is less than the overall flow rate.

3. The system of claim 2, wherein the prediction engine determines that the valve is stuck in a closed position if the actual flow rate is less than the closed position set-point when the actual flow rate is less than the overall flow rate threshold.

4. The system of claim 2, wherein the prediction engine determines that the valve is stuck in a partially open position if the actual flow rate is greater than the closed position set-point and less than the partially opened set-point when the actual flow rate is less than the overall flow rate threshold.

5. The system of claim 2, wherein the prediction engine determines when the valve of the cooling device is malfunctioning based on a comparison of the determined temperature of the liquid to the temperature threshold.

6. The system of claim 5, wherein the notification engine notifies the user when the determined temperature of the liquid is greater than the temperature threshold.

7. A non-transitory computer readable medium storing instructions executable by a processor for valve failure prediction, wherein the instructions are executable to:
    determine when an actual temperature of a liquid exiting a cooling device comprising a valve is greater than a temperature threshold;
    determine when an actual flow rate of the liquid exiting the cooling device is less than an overall flow rate threshold when the actual temperature is greater than the temperature threshold;
    determine when the actual flow rate is less than a closed position set-point when the actual flow rate is less than the overall flow rate threshold; and
    determine when the actual flow rate is greater than the closed position set-point and less than a partially opened set-point when the actual flow rate is less than the overall flow rate threshold; and send a first alert to a user when the actual flow rate is less than the closed position set-point and send a second alert to the user when the actual flow rate is between the closed position set-point and the partially opened set-point.

8. The medium of claim 7, wherein the first alert is an alert that the valve is in a closed position.

9. The medium of claim 7, wherein the second alert is an alert that the valve is not opening fully.

10. The medium of claim 7, wherein the first alert and the second alert result in instructions executable to determine an update of the actual temperature exiting the cooling device.

11. A method for valve failure prediction, comprising:
determining when an actual temperature of a liquid exiting a cooling device comprising a valve is greater than a temperature threshold;
determining when an actual flow rate of the liquid exiting the cooling device is less than an overall flow rate threshold when the actual temperature is greater than the temperature threshold;
determining when the actual flow rate is less than a closed position set-point when the actual flow rate is less than the overall flow rate threshold;
determining when the actual flow rate is greater than the closed position set-point and less than a partially opened set-point when the actual flow rate is less than the overall flow rate threshold; and
sending an alert to a user in response to the actual flow rate being less than the closed position set-point or in response to the actual flow rate being between the closed position set-point and the partially opened set-point.

12. The method of claim 11, wherein sending the alert includes sending the alert in response to the actual temperature being greater than the temperature set point.

13. The method of claim 11, wherein sending the alert includes sending the alert in response to the actual flow rate being less than the overall flow rate.

14. The method of claim 11, wherein the valve is a wax valve.

15. The system of claim 1, wherein the cooling device comprises a thermal busbar.

16. The medium of claim 7, further comprising instructions executable to determine that the valve is stuck in a closed position if the actual flow rate is less than the closed position set-point when the actual flow rate is less than the overall flow rate threshold.

17. The medium of claim 7, further comprising instructions executable to determine that the valve is stuck in a partially open position if the actual flow rate is greater than the closed position set-point and less than the partially opened set-point when the actual flow rate is less than the overall flow rate threshold.

18. The method of claim 11, further comprising determining that the valve is malfunctioning if the actual flow rate of the liquid exiting the cooling device is less than the overall flow rate.

19. The method of claim 11, further comprising determining that the valve is stuck in a closed position if the actual flow rate is less than the closed position set-point when the actual flow rate is less than the overall flow rate threshold.

20. The method of claim 11, further comprising determining that the valve is stuck in a partially open position if the actual flow rate is greater than the closed position set-point and less than the partially opened set-point when the actual flow rate is less than the overall flow rate threshold.

* * * * *